Inventor
William White Jacques,

By Reuben L. Roberts.
his Attorneys.

Patented Aug. 12, 1924.

1,504,247

UNITED STATES PATENT OFFICE.

WILLIAM WHITE JACQUES, OF CHESTER, NOVA SCOTIA, CANADA.

METHOD AND MEANS FOR DETECTING AND LOCATING SUBMARINES.

Application filed May 14, 1918. Serial No. 234,404.

*To all whom it may concern:*

Be it known that I, WILLIAM WHITE JACQUES, a citizen of the United States of America, at present residing at Chester, Nova Scotia, in the Dominion of Canada, have invented a new Method and Means for Detecting and Locating Submarines.

The fundamental conception of this invention involves a discovery I have made that a thinly enclosed mass of air submerged within a body of water—whether a bubble or a submarine—magnifies in loudness musical sounds that impinge upon and are intromitted to it from the surrounding water; and when the musical sound is sympathetic in pitch with some note within the range of resonance of the submerged mass of air, this magnification is so pronounced that, within such areas as the detecting and locating of submarines is desired, a submarine becomes itself a resonated source of similar musical sound comparable in loudness with the musical sound produced within the water at the original source.

By producing short musical sounds at frequent intervals of time and at any convenient place within the body of water, and listening through a microphone submerged at any convenient place, the presence of a submarine within the body of water is easily detected by the musical sound it emits.

By submerging microphones at two places, whose positions relative to the original source of sound are known, and measuring at each microphone the interval of time between the arrival of the sound from the original source and the arrival of the resonated sound from the submarine, and already knowing the velocity of sound in water, we are possessed of all the data necessary for finding by triangulation the exact position of the submarine; and, by a series of such measurements, made at frequent intervals, to follow a moving submarine along its course.

A mechanism is provided which mechanically and instantly performs the triangulation, and pricks each position and the course of the submarine on a chart.

As will presently appear, the method makes use of other discoveries I have made in the science of sound, and other mechanisms devised, which permit the method to be effectively used under the conditions that are met with in submarine warfare.

Stated more specifically, this method of determining the distance and direction of a submarine from a locating station consists in setting the submarine into musical vibration, so that the submarine itself becomes a source of musical sound, by impressing upon its hull, through the intervening water, a musical sound sympathetic in pitch with some note within the range of resonance of the submarine, produced within the water at the locating station or at some place whose position relative to the locating station is known; and in finding the desired distance and direction by measuring, at each of two points within the water whose positions relative to the locating station are known, the interval of time between the arrival of the sound from the original source and the arrival of the sound emitted by the submarine, and multiplying each such interval by the known velocity of sound in water; the desired distance and direction being found directly from the time intervals by mechanical calculation.

The original sound is produced within the water by blowing a current of steam well down into the water through a brass pipe that is partially closed at the outlet by a brass diaphragm having in its center a circular aperture. When the steam reaches the water it blows a bubble, which quickly collapses. The rapid and periodic expanding and collapsing of the rapidly succeeding bubbles of steam moulds in the surrounding water a train of alternate zones of condensation and rarefaction of the water—that is, a train of musical or periodic sound waves—which pass outward in all directions through the water with a velocity of 1570 yards per second, and carry the energy embodied in them by the steam-blown pipe. When using a pipe which I have found excellent for locating submarines at great distances, the time consumed in the expanding and collapsing of each bubble is about 1/200 of a second. The length of each wave, comprising its half-wave of condensation followed by its half-wave of rarefaction, is about 23.5 feet. The power that this steam-blown pipe embodies in these musical waves is about 100 horsepower. Less powerful pipes may well be used in making locations at lesser distances; thus, a 5 horse-power pipe, having a pitch an octave higher than that of the pipe above described, serves excellently to accurately follow the movements of a submarine a mile away.

By means of a quick-acting valve, arranged to suddenly close the aperture in the diaphragm simultaneously with the sudden shutting off of the steam at the entrance to the pipe, the musical sound is caused to terminate with almost instantaneous abruptness, giving to the ear the impression of a sharp "kick." Such abrupt termination of the musical sound is of vital importance in practising this method; in order to accurately measure brief intervals of time it is of course necessary to have definite times between which to make measurements. The duration of this kick is insignificantly short compared with the intervals of time measured; that is, to the ear, the interval between the time when the full musical sound is heard and the time when it is not heard is insignificantly short when compared with the interval of time between the arrivals at any microphone of the termination of the sound from the pipe and the termination of the sound from the submarine. The sound emitted by the submarine, or secondary sound, is essentially a facsimile of the primary sound, excepting that it is not so loud. It has the same musical pitch, and terminates with similar abruptness. It is the interval of time between the termination of the primary sound and the termination of the secondary sound that is measured.

The arrivals of the respective sounds at each of the two points within the water at which the intervals of time are measured are detected by placing an under-water microphone at each of these points; each microphone being electrically connected with a receiving telephone at the locating station.

The time intervals are measured by microphonically throwing the ticking of a watch into the circuit connecting the under-water microphone with the receiving telephone; the observer counting the number of whole ticks and estimating the additional fractions of ticks. By thus having the sounds to be measured and the means of measuring them simultaneously in the observer's ear, errors of personal equation are reduced to a minimum. By introducing several receiving telephones into the circuit, several observers simultaneously make measurements; the mean results insuring great accuracy in brief time.

From the thus measured intervals of time the position of the submarine is mechanically and immediately calculated and charted by a device presently to be described; so that the position and course of the submarine is at all times known.

Provided the musical sound produced at the locating station is sympathetic in pitch within the range of resonance of the submarine, and because of the great density and elasticity of water, the submarine is set into musical vibration practically simultaneously with the arrival through the intervening water of the musical sound from its distant source; and because of the powerful damping effect of water upon the submarine's vibrations, the damping being itself the emission of the sound from the submarine to the surrounding water, the terminal kick of sound is emitted by the submarine practically simultaneously with the arrival at the submarine of the terminal kick of the original sound.

The velocity of sound in water is measured, for use in this method, by placing a submarine at a known position relative to the locating station, and then determining the velocity of sound by the means used in practising the method. Numerous such measurements in which the submarine was placed at different known distances from the locating station give the same velocity of 1570 yards per second, at the temperature of fifty-eight degrees Fahrenheit. It may be remarked that this value is fairly in agreement with the best determinations made in other ways and given in the books.

I find by experiment that any one submarine, of course submerged in the water, has a considerable range of resonance, that is, it is freely set into sympathetic vibration, so that it becomes itself a source of similar musical sound, by impressing upon its hull through the intervening water, musical sounds varying in pitch within considerable limits; though this range is small compared with that of audible musical sounds. Different submarines, differing in their size and complexity of construction, differ in their range of resonance. In general, large and complex submarines have a narrower range of resonance than smaller and less complex submarines; and larger submarines resound most loudly to notes lower down in the musical scale than smaller ones. For example, a large submarine of fifteen hundred tons submerged displacement, broken in volume, heavily braced, and crowded with machinery and devices, resonates freely in sympathy with distant sources of musical sound whose pitches vary half an octave above or below F 2; and a smaller submarine of eight hundred tons resonates freely in sympathy with a wider range of pitches above and below C 3; but neither submarine resounds to very shrill or very grave notes.

When one is on the lookout—on the hark for detecting the presence of submarines whose size may be quite unknown—he serially and frequently sounds a series of pipes varying in pitch from somewhat below to somewhat above the above mentioned notes; and of course makes his locations with the one that has thus been found best.

In general, larger submarines emit more sound to the water than smaller ones, and are detected and located at greater distances.

When one is on board a submarine upon which a musical sound is falling from the distant musical source—provided of course the sound is within the range of pitch to which the submarine is sympathetic—he plainly hears, rising above the many loud noises that originate on board the submarine, the characteristic pitch and quality of the sound uttered at the source. In fact the whole interior of the submarine is alive with this musical sound; not only the shell but the bulkheads and beams and even the machines and devices are thus in loud musical vibration. This sound is emitted by the submarine to the surrounding water, and is heard through the intervening water by the microphones submerged miles away.

I find that at depths of several fathoms below the surface—depths at which the locating musical sounds are mostly used—the sea, unlike the air, is normally free of sound. The living things which densely populate the sea make no sound that is audible through the microphone. Fishes swim without noise. Even a huge albercore, easily half a ton in weight and having powerful fins and tail, swam swiftly by, within a few yards of the microphone, quite unheard. The big tree-like growths of under-water forests bend their branches to moving currents in the water; but they make no sound; there is no soughing as when the wind blows through the trees. The noisy surf on a neighboring beach or the noise of waves breaking on a nearby ledge is unheard through the water. So far as nature's sounds are concerned, well down in the water the sea is deathly still. Sounds do not readily pass from air into water, and sounds made by nature or by man above the surface are rarely heard at considerable depths beneath. Even the firing of heavy guns on board a ship in deep waters is only undisturbingly heard in microphones trailing from a nearby ship.

Through these waters a train of musical sound waves passes with facility to great distances; but even a loud shock or noise is hardly propagated and soon dies out. A shot-gun fired under water was only audible in a microphone one hundred yards away; yet, when a similar gun-barrel was used as a steam-blown musical pipe, a small submarine that was moving under water more than a mile away was easily followed along its course.

I find that sounds originating on board submarines, being rather of the nature of noises than pure musical sounds, do not carry to any great distance through the water, and are not heard in the microphone unless quite close at hand. Even such sounds as are then heard are so different in character from the musical sounds used in following the submarine's course that they in no way interfere with the practising of this method.

Other surface ships that may be in the neighborhood where a locating ship is operating do not interfere with the detecting and locating of a submarine unless the microphones come quite near the other surface ship—which in practice need seldom occur. The sounds originating on board a surface ship mostly escape—along the line of least resistance—into the surrounding air, and are only fractionally communicated to the water; and again, the sounds originating on board a surface ship, being rather of the nature of noises than pure musical sounds, do not carry to any great distance through the water; and even such sounds as are sometimes heard in the listening microphones are so different in character from the musical sounds used in locating submarines that the listener easily ignores them when he fixes his attention on the measurements of the musical sounds.

When practising this method it often happens that neighboring surface vessels somewhat pick up the musical sounds from the water, and that these sounds are audible in the compartments down below, and more markedly in the companion-ways, ventilators and other passages through which the sounds escape to the open air. Of course the sounds are insignificantly feeble compared with the resonated sound within a submarine. Like the sounds originating on board the ship, these picked-up musical sounds also mostly escape into the surrounding air, and are only unnoticeably returned to the water.

That, within such areas as the finding of submarines is desired, the resonated sound emitted by a submarine is comparable in loudness with the sound emitted by the steam-blown pipe is of course apparent to one engaged in practising this method. But we may go further, and, by placing a given submarine at a known distance from a given pipe, measure approximately the relative loudness of these two sources of sound.

During my early experiments, a small submarine was placed one mile away from a small steam-blown musical pipe; both being well down in deep water. Short and frequent "toots" of sound were sent out from the pipe; and of course the submarine responded with similar though somewhat fainter "toots". With a microphone, like that shown in this specification, a point was selected in the water (2000 yards from the submarine) where the sound from the submarine was heard with a certain definite loudness. Then the microphone was moved until a second point was found where the sound from the pipe was heard with this same definite loudness, (14100 yards from the pipe). Assuming that, down in these deep waters, sound decays proportionately to the square of its distance from its source, we find, since $2000^2/14100^2 = 1/50$, that the submarine was 1/50th as loud a source of sound as the pipe. When we remember, as others and myself have found, that the ear easily hears two successively uttered sounds, one of which is only 1/50000th as loud as the other, we see that the two sources of sound are of the same order of magnitude. Any other possible assumption as to the decay of sound with distance would make the difference in loudness between the two sources of sound still less.

The phenomenon known to science as an "echo" is far too feeble to disturb the practising of this method. If the same submarine that emits so loud a resonance that it is heard miles away at the detecting microphone is filled with water, so that resonance becomes impossible, though it should reflect sound the same, no sound comes from the submarine sufficient to be heard at the distant microphone, or indeed when the microphone is brought nearby. Even the large surface of the bottom of the sea, which is not a resonant body, returns to the microphones only a feeble purring sound that is so different in quality from the characteristically pure musical sound from the pipe and its facsimile from the submarine that it leads to no confusion. Indeed it is only occasionally that this echo is heard at all.

Having found, by experiment, that a submarine so magnifies in loudness musical sounds of proper pitch which impinge upon and are intromitted to it from the surrounding water that, within such areas as the finding of submarines is desired, the submarine itself becomes a resonated source of musical sound, so comparable in loudness with the original source of sound that a submarine is readily detected and located, and also having found, by experiment, the futile feebleness of the echo from a submarine, we may mathematically confirm these results, and also determine the quantitative values of the various phenomena concerned, by applying general equations on sound, established by Lord Rayleigh, to the specific case of a cigar-shaped, thin, steel shell, filled with air and submerged in water—in short, to a submarine.

If the reader will refer to Lord Rayleigh's "Theory of Sound" (Macmillan, London, 1896,) and turn to Volume II, paragraph 270, pages 78 to 81 inclusive, he will readily see how Rayleigh arrives at the equation (18), which is a general formula for calculating the amplitude of the reflected wave, relative to the amplitude of the original wave, when a train of sinusoidal or musical sound waves impinges from one medium upon the surface of a different medium, and at any angle of incidence.

Rayleigh illustrates the application of equation (18) by a numerical example in which the train of musical waves impinges from air, perpendicularly, upon a flat surface of water; and finds the reflection, in that case, sensibly perfect.

We are to apply equation (18) to a train of musical waves impinging from water upon a convex surface of air; for a submarine is, acoustically, a huge bubble of air immersed in water; the thin steel shell serving to mold the air into a cylindrical shape with conical ends, to hold the bubble of air submerged and, because of its tenuity and the great energy and wave-length of the impinging musical sound, to transmit diaphragmatically the sound from the water to the enclosed air.

Equation (18) reads $$\frac{\varphi''}{\varphi'} = \frac{\frac{\rho_1}{\rho} - \frac{\cot \theta_1}{\cot \theta}}{\frac{\rho_1}{\rho} + \frac{\cot \theta_1}{\cot \theta}}$$

Substituting for $\theta_1$ its value in terms of $\theta$, and the refractive index, expressed in terms of the relative velocities of sound in water and air, this equation becomes:

Equation (18$^A$)

$$\frac{\varphi''}{\varphi'} = \frac{1 - \frac{\rho v}{\rho_1 v_1}\sqrt{1 - \left(\frac{v_1^2}{v^2} - 1\right)\tan^2 \theta}}{1 + \frac{\rho v}{\rho_1 v_1}\sqrt{1 - \left(\frac{v_1^2}{v^2} - 1\right)\tan^2 \theta}}$$

in which—

$\frac{\varphi''}{\varphi'}$ is the amplitude of the wave reflected from the surface of the submarine, relative to the amplitude of the wave that impinges upon the surface of the submarine.

$\frac{v}{v_1}$ is the ratio of the velocity of sound in water to the velocity of sound in air, i. e. 4.30. Its reciprocal being 0.232.

$\frac{\rho}{\rho_1}$ is the ratio of the density of water to the density of air, i. e. 700.

$\theta$ is the angle of incidence at which the train of sound waves in the water impinges upon the convex surface of the submarine.

The numerical constants given by Rayleigh agree excellently with similar constants calculated from data given in the well known and reliable "Physikalisch-Chemische Tabellen" of Landolt and Bornstein, (Julius Springer, Berlin, 1894). We will therefore adopt the same constants—or rather their reciprocals, since our problem deals with a train of sound waves impinging from water upon air.

We shall presently see that neither the direction of the major axis of the submarine, relative to the direction of the train of impinging waves, or the part of the surface of the submarine on which they strike, is of material significance in determining the fraction, of the whole sound falling upon the submarine, that is reflected from its surface as a whole.

By substituting the above-given numerical constants into the equation (18<sup>A</sup>), we get Equation (18<sup>B</sup>)

$$\frac{\varphi''}{\varphi'} = \frac{1 - 3010\sqrt{1+0.95 \tan^2 \theta}}{1 + 3010\sqrt{1+0.95 \tan^2 \theta}}$$

By successively assigning various specific values to $\theta$, solving the equation for each such value, and remembering that, in all cases, the sum of the energies of the reflected and intromitted waves equals the energy of the impinging wave, and also that a positive result shows that fraction of the impinging wave which is reflected, while a negative results shows that fraction of the impinging wave which is not reflected, but intromitted to the submarine, we find that, at all angles of incidence, the reflected wave is very small, and the intromitted wave very large. This intromitted wave carries into the submarine an energy equal to the square of its amplitude.

For example, if $\theta$ be 0, we find (numerical values being in all cases only approximate) that the Amplitude of the reflected wave, or echo, is______________________ 0.00066
Amplitude of the intromitted wave is______________________ 0.99934

If $\theta$ be 45 degrees,

Amplitude of the reflected wave is__ 0.00048
Amplitude of the intromitted wave is______________________ 0.99952

By thus employing this equation (18<sup>B</sup>) to explore all parts of the surface of the submarine, and at frequent angles, we find that the Mean amplitude of the reflected wave is______________________ 0.00040
Mean amplitude of the intromitted wave is______________________ 0.99960 which amplitudes do not significantly differ from those at 45 degrees, or even from those at 0 degrees, where the reflection is at a maximum.

Since the energy of any sound wave is proportional to the square of the amplitude, we find, taking the energy of the impinging wave as unity, that the Energy of whole reflected sound, or echo, is about____________ 0.00000002
Energy of whole intromitted sound is about______________ 0.99999998

It is not strange that even the most sensitive microphone is unable to discover the insignificant echo from a submarine.

Practically all of the energy of the train of musical sound waves that impinges upon the whole surface of the submarine from the surrounding water passes into the air within the submarine. This energy must do some work.

While the sound waves thus readily carry their energy from the outside water into the inside air, an application of the above Rayleigh general equation (18) to musical sound waves passing from air to water through a concave surface shows that these energy-laden waves do not readily pass out. We may picture the waves as trapped within this huge bubble of air—bounding back and forth within its concave walls; and, since the sound is sympathetic in pitch with some note within the range of resonance of this confined air, this huge resonator rapidly and enormously multiplies the loudness of the wave—until the sound breaks through the walls, and becomes the loudly resonated musical sound that enables us to detect and locate the submarine.

Of course this resonator does not create energy; but it multiplies the maximum condensation and minimum rarefaction of the wave—multiplies the maximum amplitude of the wave—partly at the expense of the form of the wave, and partly because such an under-water resonator reaches well out into the surrounding water and attracts into itself musical sounds from regions where otherwise they would be felt. (See Rayleigh, Volume II, page 209.)

Knowing the energy of a steam-blown musical pipe, we may calculate numerically the sound that falls upon a given submarine at a given distance from the pipe, and also the sound that the submarine sends out; and thus quantitatively determine, at least approximately, the resonating power of the submarine. In these calculations we shall make use of relationships between energies, velocities, amplitudes, etc. of sound waves, shown by Lord Rayleigh (Volume II, pages 434 and 435.) For simplicity we will use the centimeter-gramme-second system.

Rayleigh tells us that the mechanical value of a series of progressive waves in the water is the same as the kinetic energy of the mass of water concerned, supposed to be moving with velocity $v$ of vibration. The general equation may be written $$E = \frac{1}{2}v^2 S a \rho \text{ or } v = \sqrt{\frac{2E}{S a \rho}}$$

For a sound of given periodicity ($\tau$), the amplitude of the wave is $$x = \frac{v\tau}{2\pi}$$

The numerical values to be inserted in these equations are $E_1$ = energy of the pipe = $3.75 \cdot 10^{10}$ ergs per second. (About 5 HP.)
$S_1$ = area of wave front, from pipe, at submarine = $42 \cdot 10^{10}$ sq. cm.
$a$ = velocity of sound in water = $1.43 \cdot 10^5$ cm. per sec.
$\rho$ = density of water = 1.
$\tau$ = period of the wave = $1 \cdot 10^{-3}$ sec.
$x_1$ = maximum amplitude of impinging wave, at submarine.
$v_1$ = maximum velocity of vibration of impinging wave, at submarine.
$E_{11}$ = energy (resonant) of submarine = $7.5 \cdot 10^8$ ergs per sec.
$S_{11}$ = area of surface of submarine = $3.58 \cdot 10^4$ sq. cm.
$x_{11}$ = maximum of amplitude of emitted wave, at submarine.
$v_{11}$ = maximum velocity of vibration of emitted wave, at submarine.

Inserting numerical values, and solving the equation, both for the sound that impinges upon the surface of the submarine and for the sound that the surface of the submarine emits, we find Amplitude of the impinging wave = $17.5 \cdot 10^{-8}$ cm. = 0.000000175 cm.

Amplitude of the emitted wave = $8840.0 \cdot 10^{-8}$ cm. = 0.000088400 cm.

That is, the amplitude of the musical sound wave sent out by the resonating submarine is a little more than 500 times the amplitude of the musical sound wave that falls upon its surface. The energy of the wave is magnified about 250000 times. The mechanical resonating power of this submarine, one mile from this pipe, is therefore 250000.

It is a matter of common knowledge that the loudness of a musical sound—that is, the intensity of sensation produced in the mind when the sound wave strikes upon the ear—varies in a proportion greater than the amplitude of the wave, and less than the energy (square of the amplitude) of the wave. The ear shrinks as it were from very loud sounds but keenly concentrates its attention on faint sounds.

Relations between the mechanical energy of a sound wave, impinging upon the ear, and the corresponding loudness of the sensation produced have been empirically worked out by numerous experimenters (see Wien, "Ueber die Messung der Tonstarker," Berlin, 1888; and Helmholtz' "Sensation of Tone," edition of 1912, page 75d); and it is found that a fairly usable formula is reached for comparing sounds of the same pitch, and of not widely different loudness. In harmony with the above, I have worked out the specific formula $L = x^{1.87}$ (L being the loudness of the sound, and $x$ the amplitude of the wave) as applicable to sound waves of such frequency and amplitudes as were used in the above described experiments. By the aid of this formula, we find that the sound emitted by this submarine, when one mile away from the pipe used, is 111400 times louder than the sound that impinges upon it. That is, the submarine, by its resonating power, multiplies the loudness of the sound about 100000 times.

The above general equations are of course applicable, whether to the small submarine, vibrated from a source of sound of five horse-power, used in early experiments, or to the large fighting submarines, vibrated from a source of sound of one hundred horse-power, to which the method was later applied; and, by inserting into these equations proper constants, obtainable from this specification, we may also mathematically confirm the above-stated and experimentally-found result, that, in general, larger submarines emit more sound than smaller ones, and are detected and located at greater distances.

The locating station may be a ship, having the microphones trailing astern; or it may be on shore, with the sounding pipe and the microphones placed at any convenient known points in the adjacent water.

In making locations from a ship, an ambiguity sometimes arises as to whether the submarine is on the starboard side or in a symmetrical position on the port side. In order to guard against such ambiguity, additional microphones are projected out from the two sides of the ship at a level between the keel and the surface of the water, and the difference in loudness of the sound from the submarine is noted.

The source of sound need not be at the locating ship, but may be on another ship, or on shore, provided the direction and distance of the source of sound from the locating ship be always known.

With this arrangement any number of locating boats may simultaneously operate in the same neighborhood without mutual interference, and any small or large boat, whether driven by power or sail, provided it be equipped with microphones, may detect and locate submarines; moreover, the submarine, hearing only the monotonous tooting of the one fixed source of sound, is not aware of the presence of such locating boats. Moving submarines have been accurately located by all of these dispositions of apparatus. Submarines have been accurately located from a moving ship equally well by night and day, in fog, rain and snow, in heavy gales of wind and high seas. In all cases it is immaterial whether the submarine be at rest or moving at any possible speed, and whether the locating ship be at rest or moving at any speed within which the use of trailing microphones is practicable.

The approach or presence of a submarine is detected, by this same locating apparatus, at greater distances than it may be accurately located; and, almost as soon as it is detected, experienced observers, by listening at the several microphones and roughly judging the intervals of time and the loudness of the sounds, soon get a good general idea of its whereabouts; so that the element of surprise is early eliminated.

For the purpose of more fully illustrating the method and the means employed in practising it, reference will be had to the accompanying drawings, in which.

Figure 1:
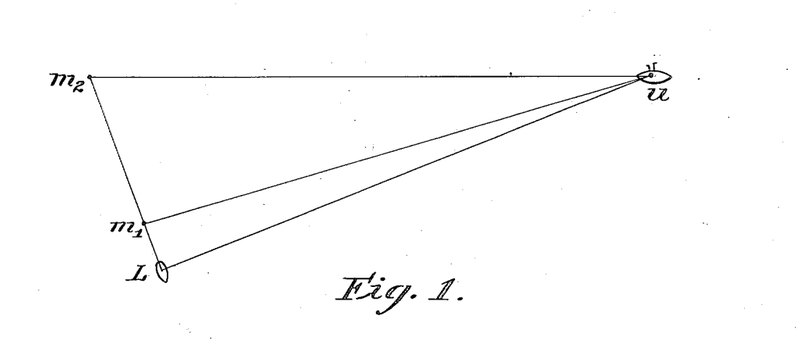
Figure 1 is a diagram or chart showing a submarine, a locating vessel where the sound is produced, two microphones trailing astern, and lines connecting these various objects in order to illustrate the sound-triangulation.

Referring to Figure 1, L is a locating vessel equipped with apparatus for producing musical sounds under water. Trailing at known distances astern of the vessel, and electrically connected with receiving telephones on board the vessel, are two submerged microphones $m^1$ and $m^2$. U is the submarine to be located. By measuring the interval of time between the arrival at $m^1$ of the primary sound (or more strictly of the termination of this sound) from L and the secondary sound from U, multiplying this interval by the known velocity of sound in water, and adding the distance L to $m^1$ (the distance that sound, passing over the path L to U, has gone while going from L to $m^1$) we ascertain the sum L to U plus U to $m^1$ of two sides of the triangle L to U to $m^1$ whose base L to $m^1$ was already known. Similarly, by measuring the interval of time between the arrival at $m^2$ of the primary sound from L and the secondary sound from U, multiplying this interval by the known velocity of sound in water, and adding the distance L to $m^2$, we ascertain the sum L to U plus U to $m^2$ of the triangle L to U to $m^2$ whose base L to $m^2$ was already known. The point at which the two triangles L to U to $m^1$ and L to U to $m^2$ have a common apex is the location of the submarine relative to the locating vessel.

Figure 10:
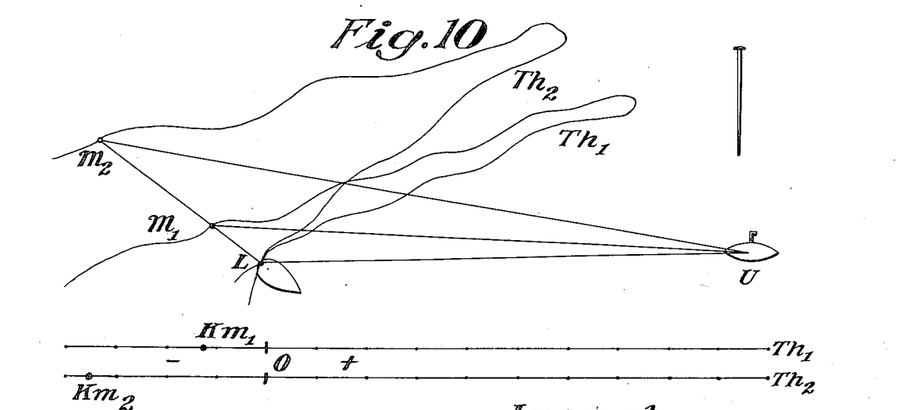
Figure 10 shows a simple device by which the previously unknown location of the submarine is mechanically charted directly from the time-intervals measured by the apparatus shown in Figure 9.

In order to avoid the delay of the sometimes complicated calculations and corrections necessary to ensure accuracy, the charting of the position is best done mechanically by the following device.

Two threads $Th^1$ and $Th^2$ (Figure 10) are previously knotted at intervals which, on the scale of the chart, represent the known velocity of sound in a unit of time. From zero first knot on one thread $Th^1$ measure off, in a negative direction, the distance L to $m^1$ and tie a large knot $Km^1$. From the zero knot in the second thread $Th^2$, measure off negatively the distance L to $m^2$ and tie a large knot $Km^2$. With a pin, fix these large knots in both threads permanently to the chart at L.

As soon as the interval of time between the arrivals of the primary and secondary sounds at $m^1$ is measured, that number of knots is counted off in a positive direction on the first thread $Th^1$, and that point on the thread is pinned to the chart at $m^1$. Similarly, as soon as the interval of time between the arrivals of the primary and secondary sounds at $m^2$ is measured, that number of knots is counted off on the second thread $Th^2$, and that point on the thread is pinned to the chart at $m^2$. The bights of the two threads thus far are slack. An extra pin is now inserted into both bights, and drawn until both threads are taut, when this pin is also inserted in the chart. This marks the now ascertained location U of the submarine.

This same pin and thread device is applicable whether the submarine be at rest or in motion, and whether the locating vessel be at rest or in motion, and to whatever relative dispositions of the locating vessel, source of sound and microphones it may be found advantageous under differing circumstances to use.

Figure 2:
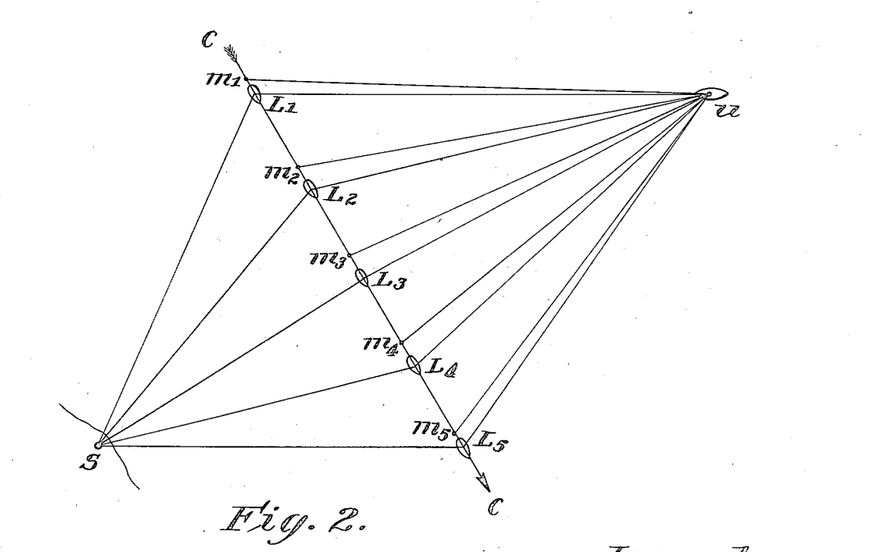
Figure 2 is a diagram or chart showing the source of sound at a fixed position on shore, a moving locating vessel with one trailing microphone, a submarine, and lines connecting these various objects in order to illustrate the visual-triangulation used in determining the course of the locating vessel, and the sound-triangulation used in locating the submarine.

A disposition of vessels and apparatus in which the source of sound is not on the locating vessel is illustrated in Figure 2, in which S is the source of sound, here placed on shore; U is the submarine; C to C is the course over which the locating vessel is moving. $L^1$ and $m^1$, $L^2$ and $m^2$, $L^3$ and $m^3$, etc., show successive positions of the locating vessel and its trailing microphone (for only one trailing microphone need now be used) at successive known intervals of time. The triangulation at the right of the course of the locating vessel is the sound-triangulation. The triangulation at the left of the course indicates how the course and speed of the locating vessel may be determined by frequent compass observations made at known intervals of time from the locating vessel to the source of sound.

Figure 3:
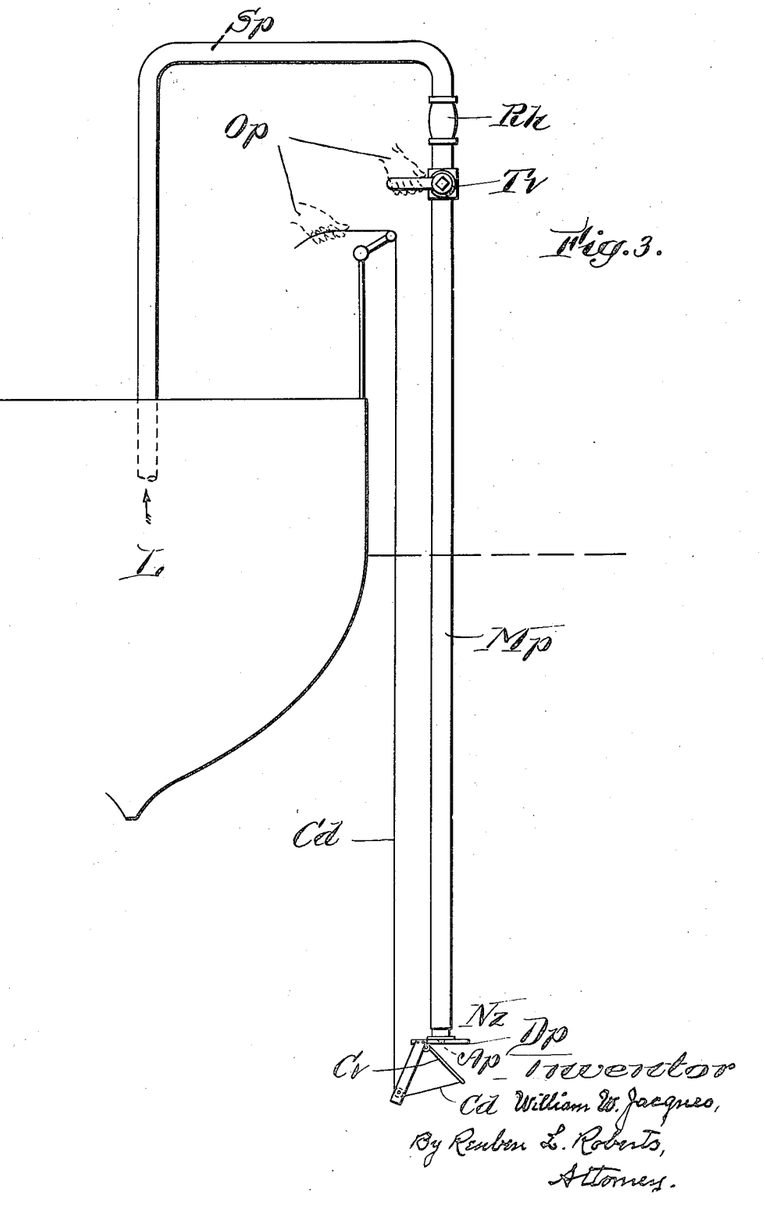
Figure 3 shows a steam-blown musical pipe, hanging down alongside a locating ship and dipping well into the water, a turn-cock valve near the top of the pipe, an apertured diaphragm at the submerged end of the pipe, a clapper valve arranged to abruptly close this aperture, and a cord running from the clapper up to the deck of the ship whereby the clapper valve is operated.
Figure 4:
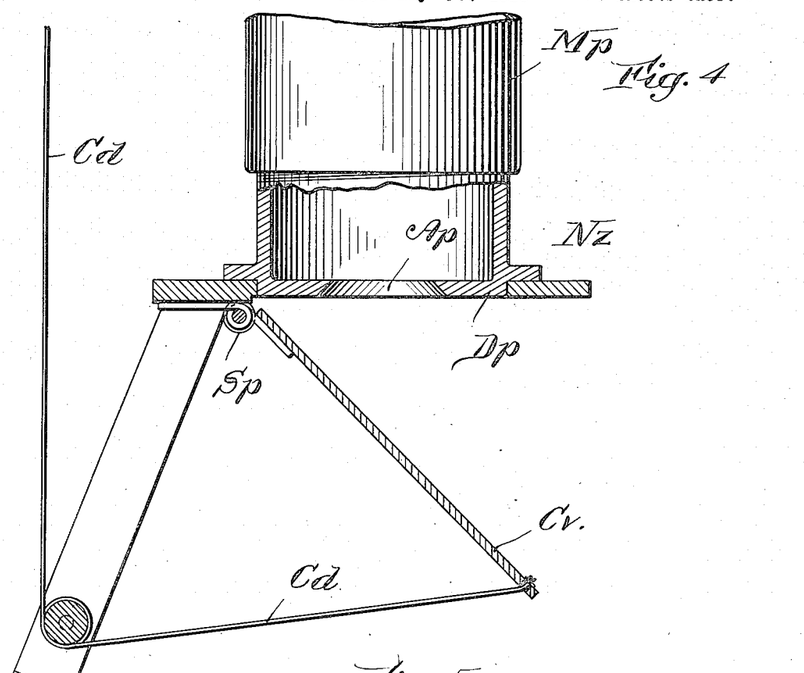
Figures 4 and 5 show in detail the construction of the apertured diaphragm and the mechanism by which the aperture may be abruptly closed.
Figure 5:
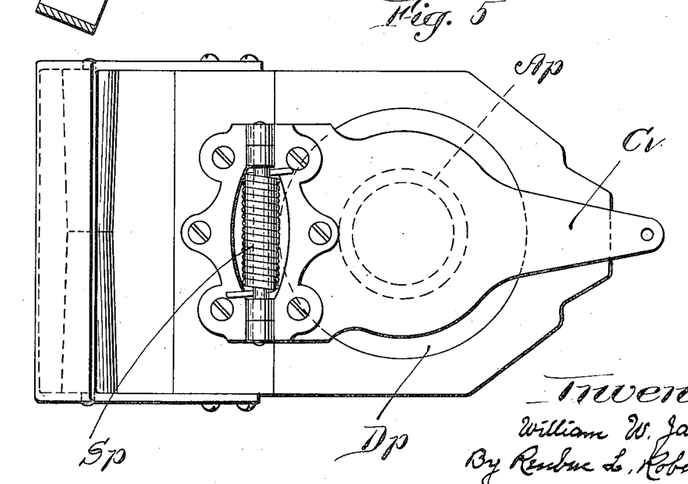

Referring to Figure 3, Mp is a brass pipe hanging down alongside the locating ship L and dipping say two fathoms or more into the water. Steam from the ship's boilers is blown from the supply pipe Sp through a short length of rubber hose Rh, whose purpose is to acoustically insulate the musical pipe; then through the turn-cock valve Tv, whose purpose is to regulate the flow of steam and more particularly to shut off the steam suddenly; thence through the pipe Mp, through the aperture Ap in the diaphragm Dp into the water, where the rapid and periodic expanding and condensing of rapidly succeeding bubbles of steam produces within the water a pure musical sound of great carrying power. The nozzle Nz at the under-water end of the pipe, together with the apertured diaphragm and mechanism for abruptly closing the aperture is shown in detail in Figures 4 and 5, the same lettering being used. The pitch of the musical sound produced is determined by the diameter and thickness of the diaphragm, together with the diameter of the aperture. The loudness depends upon the actual size of these parts, and of course upon the quantity of steam blown through the aperture. In detecting and locating submarines at great distances in deep waters, I have successfully used nozzles with diaphragms from two and a half to three and a half inches in diameter, and three sixteenths to one quarter inch in thickness, and having apertures from one and one sixteenth to one and nine sixteenths inches in diameter; sometimes using upwards of a hundred boiler horsepower of steam to blow them. The nozzle and its appurtenances, shown in Figures 4 and 5, are made of brass. In these two figures, Cv is a clapper, held open by the cord Cd which runs up alongside the pipe to one hand of the operator Op (Figure 3), whose other hand controls the turn-cock Tv. When the cord is released the stout spring Sp snaps the clapper Cv over the aperture Ap and closes it with great abruptness. By simultaneously closing the turn-cock Tv, thus releasing the pressure of steam at the aperture, and the clapper Cv, thus abruptly preventing the flow of steam out through the aperture, and the flow of water in, the musical sound is caused to cease with the necessary abruptness. In order that the operator of the sound producing pipe may at all times hear the under-water sound he is producing, and manipulate his valves accordingly, he is equipped with a head telephone that connects with the circuits from the microphones to the receiving telephones of the observers.

Figure 6:
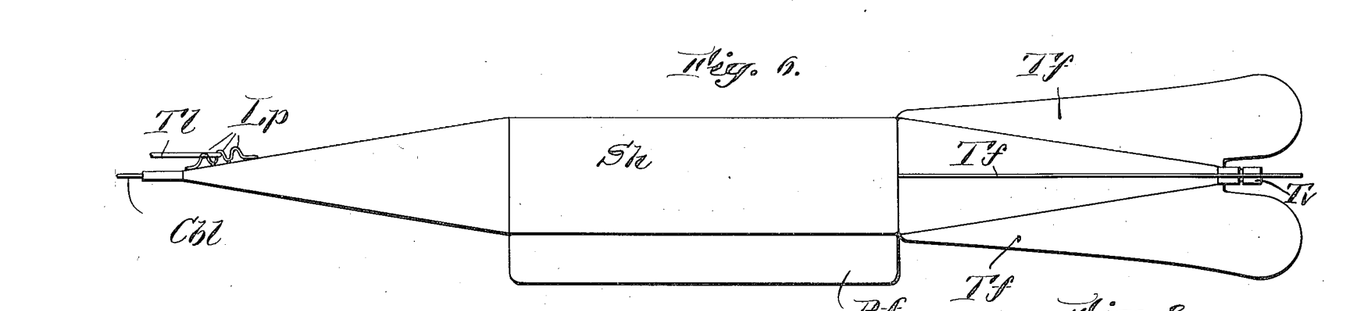
Figure 6 shows the enclosing shell of an under-water microphone suitable to be trailed from a locating ship, having fins at the tail, a lead keel at the belly, a valve at the tail by which it may be filled with compressed air, and a series of loops more or less above and behind the pointed nose, and a towing line attached to one of these loops.
Figure 7:
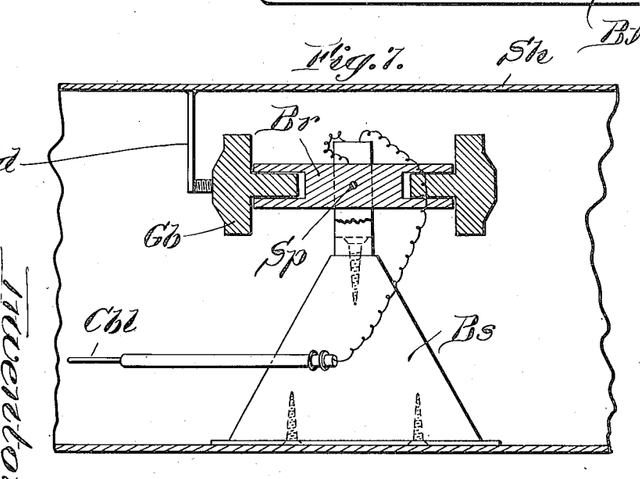
Figures 7 and 8 show the detailed construction of the microphonic mechanism within this shell.
Figure 8:
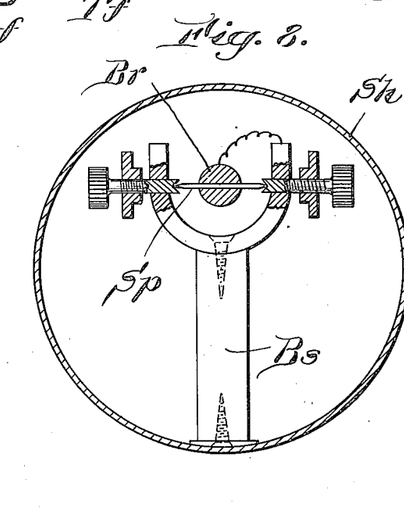

Figures 6, 7 and 8 are working drawings of an under-water-trailing-microphone that has been satisfactorily used in locating submarines from moving locating ships. It is trailed from the ship by a cod-line; this line being weighted at one or more points in order to regulate the depth at which the microphone is towed. It is electrically connected to the ship by a flexible insulated wire that hangs loosely alongside the tow line, and is seized to it at intervals of say one fathom. The diaphragm, Sh, of the microphone is a thin metallic resonating shell, modelled much like a torpedo or the shell of a submarine boat. It is three feet long, three and onehalf inches in diameter and made of tinned sheet iron one fiftieth of an inch thick. This thin shell diaphragm is distended to and maintained in a sensitive receptive and resonant condition towards the musical sounds that come to it through the water from the submarine and from the primary source of sound by filling it, through the tail-valve Tv, with compressed air at a pressure somewhat greater than that of the water at the depth at which it is to be used. The diaphragm also serves as a containing vessel for the microphonic mechanism.

A lead belly-fin, Bf, sufficiently heavy to half submerge the diaphragm, together with four light tail-fins, Tf, made of the same sheet metal as the diaphragm, tend to hold the diaphragm on an even keel and to minimize rotary and yawing motions which otherwise may cause disturbing noises in the diaphragm when it is trailed rapidly through the water. The towing line, Tl, is attached to the diaphragm slightly behind its pointed nose at one or another of the series of loops Lp, according to the depth and speed at which it is to be towed, and for the purpose of trailing the diaphragm through the water in a position slightly oblique to the line of towing; it having been found that such oblique towing of a thus shaped and finned diaphragm markedly decreases the disturbing noises. Because of the cooperative action of the tow-line attachments and heavy and light fins, all thus fittingly placed relatively to the diaphragm and to each other, the diaphragm glides through the water sufficiently free from disturbing noise to permit the desired musical sounds to be plainly heard and accurately measured.

Because of its shell shape and because of the great wave-length in water of such musical sounds as are employed in locating submarines, this diaphragm presents all parts of its surface simultaneously to the condensation, or to the rarefaction, of each of the sound waves that fall upon it; and experiment shows that all parts of its large collecting surface, excepting only the nodal line created by the lead belly-fin, are equally sensitive and receptive towards these musical sounds. Because of its resonant action, this diaphragm acoustically magnifies the loudness of the musical sounds that it collects from the water. Measurements show that this thin air-filled shell-shaped resonant diaphragm is at least several hundred times as efficient, for the purpose used, as are such diaphragms as are customarily used in telephony.

The microphonic or electric sound-magnifying mechanism is placed inside the diaphragm, and is shown in Figure 7 and 8, which are respectively a fore-and-aft and a port-and-starboard vertical cross section of the trailing microphone at the central point of the mechanism, $Sp$. This mechanism consists of an ordinary "granular-button" microphone, rigidly attached to one end of a brass rod, $Br$, and counterbalanced at the other end of the rod by a dummy button of equal weight and size; the whole being pivoted at its center of gravity and symmetry by a steel pivot, $Sp$. The stubby balance thus formed weighs about two ounces, and is fairly in equilibrium in whatever positions the diaphragm assumes in practical use. A steel rod, $Rd$, connects the diaphragm rigidly to the front electrode of the granular button. The mechanism is mounted on a wooden insulating base, $Bs$, which is attached to the inside of the diaphragm just above the lead belly-fin. The electric current for energizing the microphonic contacts enters from the wire $Cbl$, passes through the pivot $Sp$, the granular button $Gb$, and thence through the metallic shell to the water. The essential merit of this equilibrated microphonic mechanism lies in the fact that it possesses and maintains the desired combination of light normal pressure with heavy inertia in whatever positions the diaphragm usually takes when it is trailed through the water.

The operation of this under-water microphone as a whole may be appropriately likened to the operation of an astronomical telescope. The telescope enables us to see a distant star by means of the periodic waves of light it receives through the ether from the star; and the microphone enables us to hear a distant submarine by means of the periodic waves of sound it receives through the water from the submarine. Just as the efficiency of the astronomical telescope depends primarly on the optically collecting, receiving and magnifying power of its objective lens, so the efficiency of the under-water microphone depends primarily on the acoustically collecting, receiving and magnifying power of its diaphragm. And, just as the efficiency of the telescope is further greatly increased by the optical magnifying power of its eyepiece, so the efficiency of the under-water microphone as a whole is further greatly increased by the electrical magnifying power of its microphonic mechanism.

This under-water-trailing-microphone is sufficiently free from disturbing noises to permit the musical sounds used in locating submarines to be plainly heard and accurately measured when the locating ship is moving on any course at medium speeds; and it may be kept thus free of disturbing noises at high speeds by maneuvering the locating ship over a sinuous or any other curving course of moderate radius; care being taken that the microphone follows a similar and known course.

When locations are made from the shore or from a stationary ship, the under-water microphones being anchored to the bottom of the sea, such appendages as are provided to prevent disturbing noises due to trailing may of course be dispensed with if desired.

On board the locating ship the circuits coming from the several trailing microphones terminate at a small switch-board (Figure 9) that lies conveniently on the charting table. By means of this switch-board and its accessories the desired intervals of time are measured. By means of the above described pin-and-thread device (Figure 10), placed on the same charting table, the heretofore unknown location of the submarine is immediately charted from the above measured intervals of time.

Figure 9:
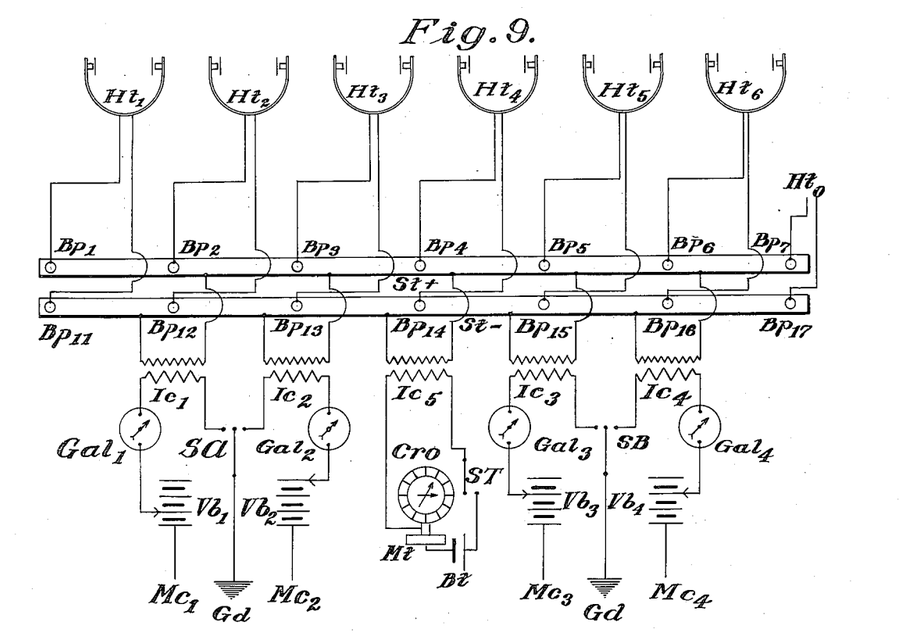
Figure 9 is a diagrammatic drawing of the listening and measuring apparatus on board the locating ship, or at any locating station.

Referring to Figure 9, $St+$ and $St-$ are two metallic strips which form the back bone of the switch-board. Above these strips, and connected to them in multiple by means of the pairs of binding-posts $Bp^1$ and $Bp^{11}$, $Bp^2$ and $Bp^{12}$, etc., are shown the observers' head-telephones $Ht^1$, $Ht^2$, etc. The circuit from $Bp^7$ and $Bp^{17}$ connects to the head-telephone of the operator, on deck, of the musical steam pipe (Figure 3). Similarly, connections may be made to head-telephones for the use of the lookouts on deck, or to any part of the ship.

On the lower side of the strips are shown the terminals $Mc^1$, $Mc^2$, $Mc^3$ and $Mc^4$ of the circuits that come from the trailing microphones, together with the necessary batteries $Vb^1$, $Vb^2$, $Vb^3$ and $Vb^4$, induction coils $Ic^1$, $Ic^2$, $Ic^3$ and $Ic^4$, and other microphone accessories. Also, the timing device by which frequent and regular ticks of sound are caused to be heard in the listening head-telephones.

Thus, $Mc^1$ is the circuit coming from the trailing microphone $m^1$ (Figure 10). It passes through the variable-voltage battery $Vb^1$, which energizes this microphonic circuit with any desired strength of current. Thence through the galvanometer $Gal^1$, where the strength of the current is indicated. Thence through the primary circuit of the induction coil $Ic^1$. Thence to the two-point switch SA where, if the switch be thrown to the left, the circuit from microphone $m^1$ is closed, the current passing to ground at $Gd$. The secondary circuit of the induction coil $Ic^1$ is connected in multiple to the two metallic strips of the switchboard. Thus, when the switch SA is thrown to the left, any under-water sound that falls upon the trailing microphone $m^1$ is heard in all of the head-telephones.

The circuit from the trailing microphone $m^2$ is in all respects similar, excepting that it is closed by throwing the switch SA to the right. Further, the circuits from the port and starboard microphones, arriving respectively at $Mc^3$ and $Mc^4$, are in all respects similar to the circuits already described, excepting that they are closed by throwing the switch SB to the left or right.

The timing device consists of a chronometer $Gro$, which ticks say five times per second. A granular-button microphone $Mt$ rests lightly against the chronometer. The circuit is from the small battery $Bt$, through the switch ST, the primary of the induction coil $Ic^5$, the microphone $Mt$, back to the battery. The secondary of this coil connects in multiple to the metallic strips with which the head-telephones are connected; the ticking of the watch being thus heard in all of the head-telephones.

The system of lettering here used sufficiently points out the details of the apparatus not otherwise specifically described.

Figure 10, and the method of using the apparatus there shown, has already been described.

Around the charting table sit any desired number of observers, each having one of the head-telephones tightly covering both ears. One of the observers does the desired switching at the switchboard, and another does the charting. The remaining observers, of whom there are several in order to secure accuracy, simultaneously measure the time-intervals in such trailing microphone as they may for the moment be connected with. Each observer writes down his measurements where they can be seen by the charter. The charter takes the mean result of all the measurements on each trailing microphone and, as he will already have his pin-and-thread device adjusted and corrected to the particular disposition of the source of sound and the microphones then being used, the hitherto unknown location of the submarine is charted immediately and, if the submarine be moving, its course is at all times shown by the series of pin pricks on the chart.

I claim:

1. The method of determining the distance and direction of a submarine from a locating station which consists in setting the submarine into musical vibration, so that the submarine itself becomes a source of musical sound, by impressing upon its hull, through the intervening water, a musical sound sympathetic in pitch with some note within the range of resonance of the submarine, produced within the water at the locating station, or at some place whose position relative to the locating station is known; and in finding the desired distance and direction by measuring, at each of two points within the water whose positions relative to the locating station are known, the interval of time between the arrival of the sound from the original source and the arrival of the sound emitted by the submarine, and multiplying each such interval by the known velocity of sound in water; the desired distance and direction being found directly from the time intervals by mechanical calculation.

2. The method of causing a submarine to become a source of musical sound which consists in impressing upon its hull, through the intervening water, a musical sound sympathetic in pitch with some note within the range of resonance of the submarine.

3. The method of detecting the presence of a submarine within a body of water which consists in producing within the water a musical sound sympathetic in pitch with some note within the range of resonance of the submarine, and observing within the water the presence of a similar musical sound resonantly emitted by the submarine.

4. The method of finding the location of a submarine within a body of water, which consists in producing at some known point within the water, a musical sound sympathetic in pitch with some note within the range of resonance of the submarine; and then measuring, at each of two known points within the water, the interval of time between the arrival of the musical sound coming directly from the source and the arrival of the resonated musical sound coming from the submarine.

5. The method of finding the location of a submarine within a body of water, which consists in producing, at some known point within the water, an abruptly-terminated musical sound; and then measuring, at each of two known points within the water, the interval of time between the arrival of the termination of the sound coming directly from the source and the arrival of the termination of the sound coming by way of the submarine.

6. An under-water-trailing microphone consisting of a torpedo-shaped thin shell diaphragm distended to its sensitive receptive and resonant condition by compressed air, equipped inside with equilibrated microphonic mechanism, and provided outside with tow-line attachments and heavy and light fins all so fittingly placed relatively to the diaphragm and to each other that their cooperation allows the diaphragm to trail through the water without disturbing noise.

7. An under-water microphone consisting of a thin shell diaphragm distended by compressed air and equipped with microphonic mechanism of light normal pressure and heavy inertia.

8. The method of minimizing the water-friction noises in an under-water-trailing microphone which consists in trailing it through the water along a sinuous or other curving course.

9. The method of mechanically calculating and charting the location of a submarine directly from the time-intervals measured at two submerged microphones whose positions and that of the source of sound are already charted, which consists in attaching respectively to the charted position of the source of sound and that of one microphone two points on a thread, graduated on the scale of the chart, whose distance apart is numerically equal to the distance of this microphone from the source of sound plus the product of the velocity of sound in water into the time-interval measured at this microphone; similarly, in attaching to the charted positions of the same source of sound and the second microphone two points on a second similar thread whose distance apart is numerically equal to the distance of this second microphone from the source of sound plus the product of the velocity of sound in water into the time-interval measured at this second microphone; then simultaneously drawing the bights of both threads until both threads are taut, when the apex common to the two triangles thus formed marks the now ascertained location of the submarine.

WILLIAM WHITE JACQUES.